United States Patent
Kumar et al.

(10) Patent No.: US 10,587,586 B2
(45) Date of Patent: Mar. 10, 2020

(54) SYSTEM AND METHOD FOR A MULTI SYSTEM TRUST CHAIN

(71) Applicant: Mocana Corporation, San Francisco, CA (US)

(72) Inventors: Srinivas Kumar, Cupertino, CA (US); Gopal Raman, San Jose, CA (US); Atul Gupta, Sunnyvale, CA (US); Shashank Jaywant Pandhare, Kothrud Pune (IN)

(73) Assignee: MOCANA CORPORATION, Sunnyvale, CA (US)

( * ) Notice: Subject to any disclaimer, the term of this patent is extended or adjusted under 35 U.S.C. 154(b) by 262 days.

(21) Appl. No.: 15/429,455

(22) Filed: Feb. 10, 2017

(65) Prior Publication Data

US 2018/0198764 A1    Jul. 12, 2018

Related U.S. Application Data

(60) Provisional application No. 62/444,686, filed on Jan. 10, 2017.

(51) Int. Cl.
*H04L 29/06* (2006.01)
*H04L 9/32* (2006.01)
*H04L 9/08* (2006.01)

(52) U.S. Cl.
CPC ........ *H04L 63/0428* (2013.01); *H04L 9/0838* (2013.01); *H04L 9/3268* (2013.01);
(Continued)

(58) Field of Classification Search
CPC ............ H04L 63/0428; H04L 63/0823; H04L 63/0281; H04L 63/126; H04L 9/3268; H04L 9/0838; H04L 2209/38
See application file for complete search history.

(56) References Cited

U.S. PATENT DOCUMENTS 8,555,348 B2    10/2013   Khosravi et al.
8,745,372 B2     6/2014   Orsini et al.
(Continued)

FOREIGN PATENT DOCUMENTS

WO        2016099644 A1    6/2016

OTHER PUBLICATIONS

"Cryptoproof Cryptographic Proof of Association", Retrieved from the Internet: https://bitcointalk.org/index.php?topic=1579977.0, Aug. 9, 2016, 10 pgs.
(Continued)

*Primary Examiner* — Joseph P Hirl
*Assistant Examiner* — Chi D Nguy
(74) *Attorney, Agent, or Firm* — Buchanan Ingersoll & Rooney PC

(57) ABSTRACT

The method provides a multi system trust chain between a client system and a remote system in a secure connection, wherein an intermediary system associated with the network flow path serves as a signing entity to establish an end to end transitive trust. The intermediate system is a corroborative entity in the operations technology (OT) realm of the client system. The remote system serves as the host for a plurality of services in the information technology (IT) realm. A two way handshake during the initial secure exchange protocol between a local client application and a remote service is extended to a three way handshake that includes a nonce issued by the remote service on the remote system and a digital signature for the nonce issued by a signature service on an associated intermediate system. The nonce signature is verified authoritatively at the remote system based on the signing certificate of the intermediate system for explicit proof of association.

12 Claims, 8 Drawing Sheets

(52) U.S. Cl.
CPC ...... *H04L 63/0281* (2013.01); *H04L 63/0823* (2013.01); *H04L 63/126* (2013.01); *H04L 2209/38* (2013.01)

(56) References Cited

U.S. PATENT DOCUMENTS

| | | |
|---|---|---|
| 8,782,393 B1 | 7/2014 | Rothstein et al. |
| 8,788,805 B2 | 7/2014 | Herne et al. |
| 9,077,709 B1 | 7/2015 | Dall et al. |
| 9,258,331 B2 | 2/2016 | Dyer et al. |
| 9,489,498 B2 | 11/2016 | Cha et al. |
| 2003/0172090 A1* | 9/2003 | Asunmaa ................ G06F 21/31 |
| 2012/0084565 A1* | 4/2012 | Wittenberg ........... H04L 9/3213 |
| | | 713/172 |
| 2013/0156189 A1 | 6/2013 | Gero et al. |
| 2015/0074407 A1 | 3/2015 | Palmeri et al. |
| 2015/0163222 A1 | 6/2015 | Pal |
| 2015/0271188 A1 | 9/2015 | Call |
| 2015/0281219 A1* | 10/2015 | Kostiainen ............ H04L 9/3247 |
| | | 713/156 |
| 2015/0288679 A1 | 10/2015 | Ben-Nun et al. |
| 2017/0180314 A1* | 6/2017 | Walker ................... G06F 21/00 |
| 2018/0109538 A1* | 4/2018 | Kumar .................... H04L 63/08 |
| 2018/0191695 A1* | 7/2018 | Lindemann ......... H04L 63/0853 |

OTHER PUBLICATIONS

Nguyen, Jamie , "OpenSSL Certificate Authority", Retrieved from the Internet: https://jamielinux.com/docs/openssl-certificate-authority/create-the-intermediate-pair.html, Dec. 9, 2015, 5 pgs.

\* cited by examiner

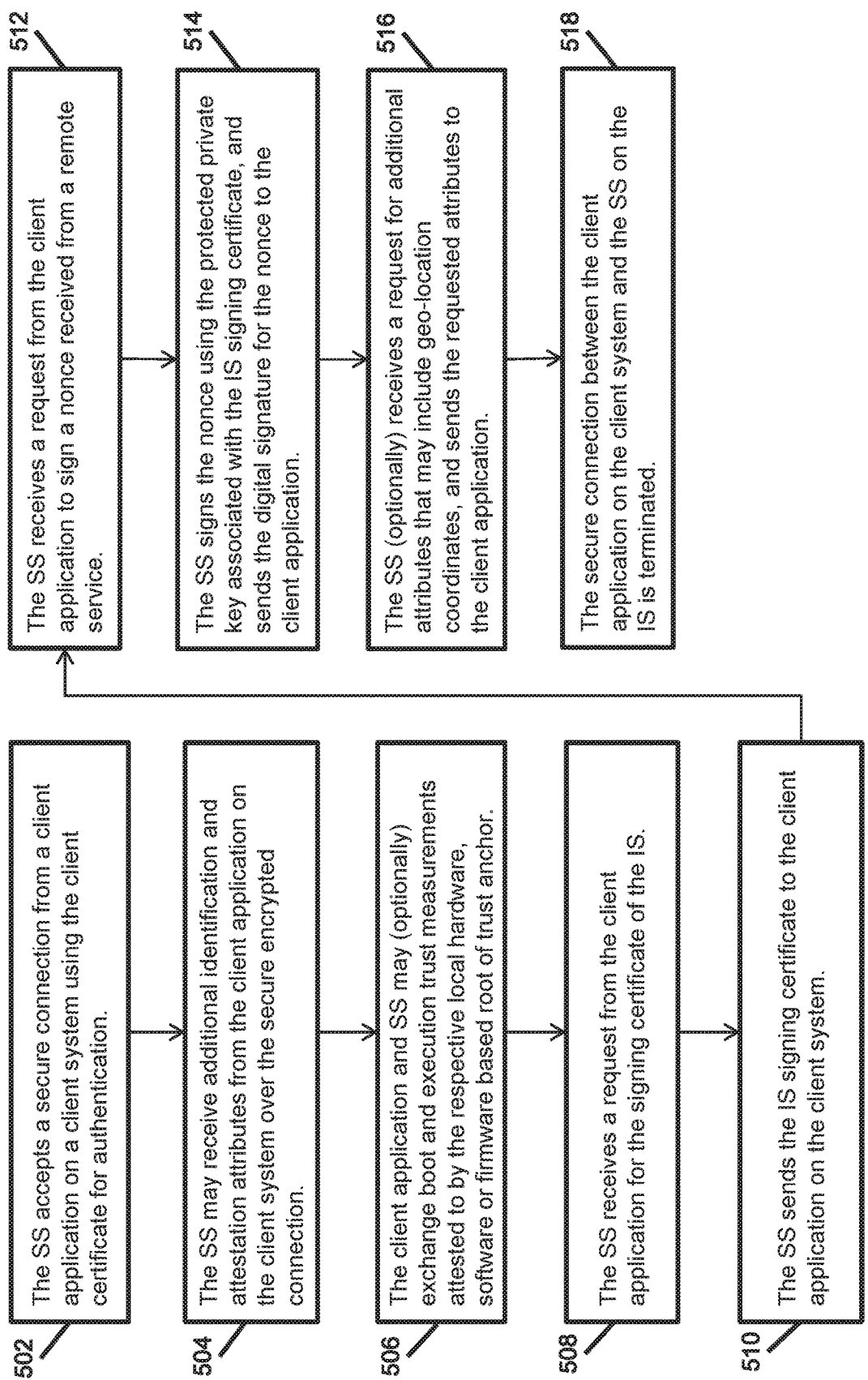

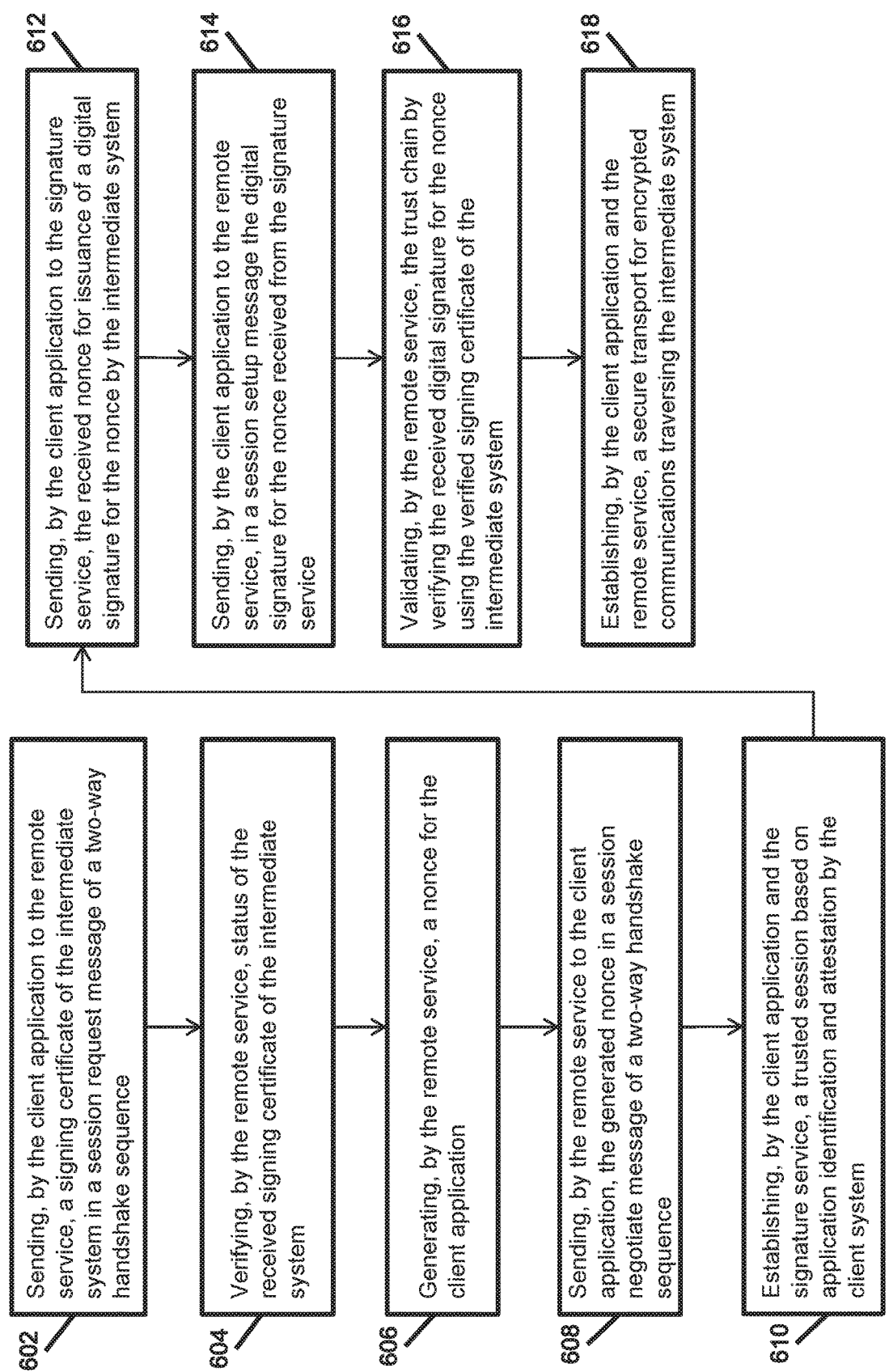

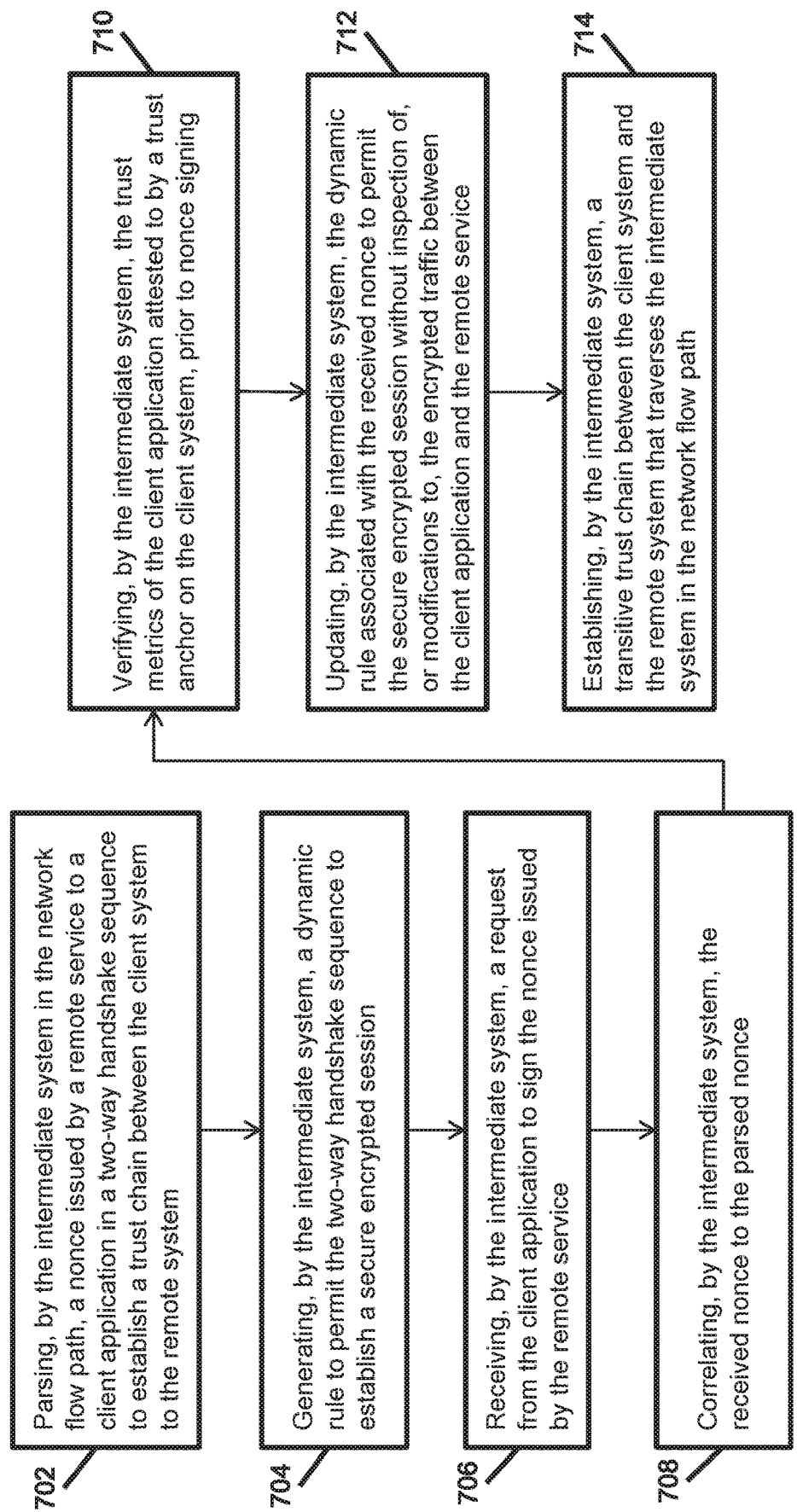

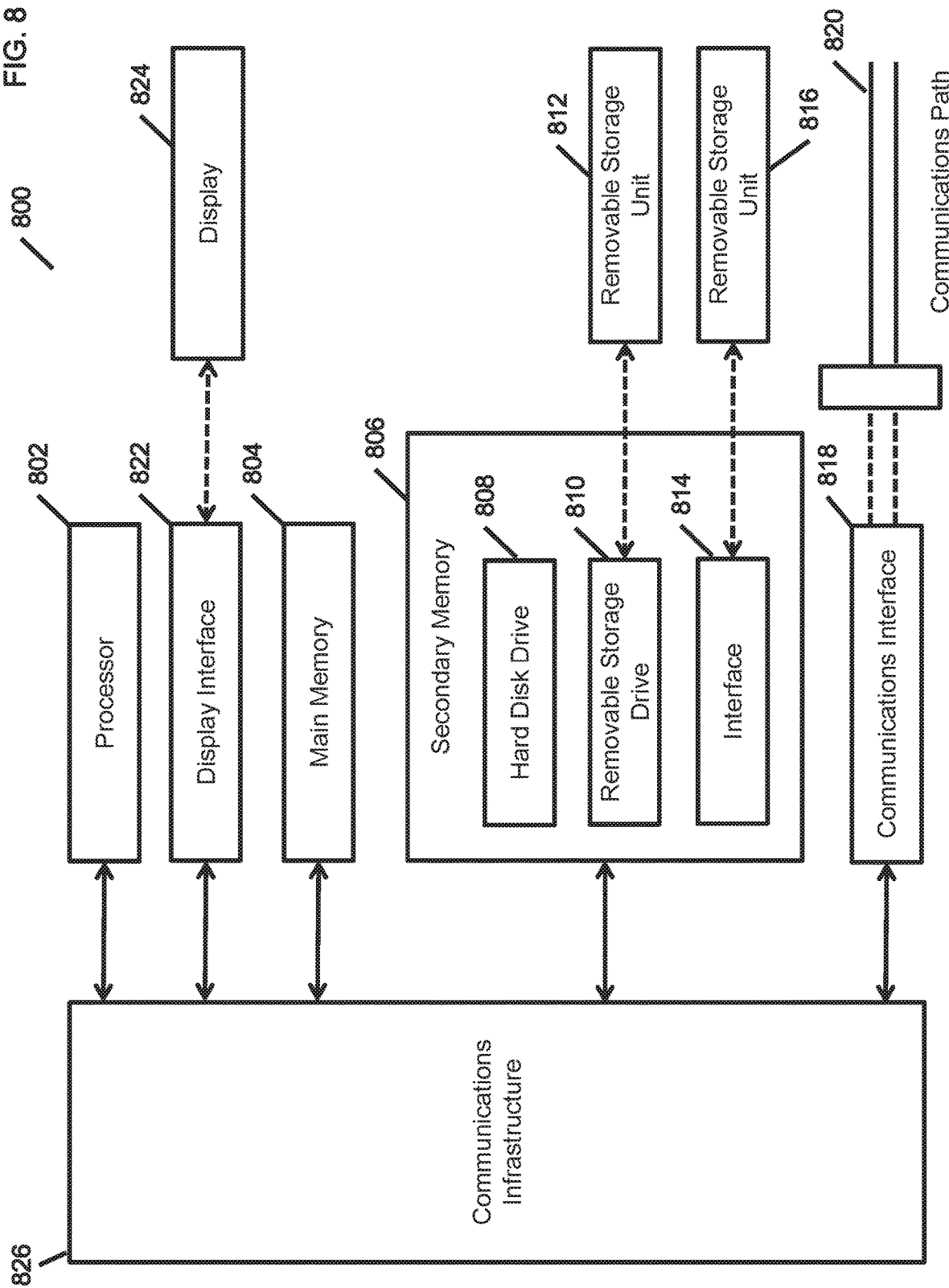

SYSTEM AND METHOD FOR A MULTI SYSTEM TRUST CHAIN

CROSS-REFERENCE TO RELATED APPLICATIONS

This application claims the benefit under 35 U.S.C. § 119(e) of U.S. Provisional Patent Application No. 62/444,686, entitled "SYSTEM AND METHOD FOR A MULTI SYSTEM TRUST CHAIN", filed on Jan. 10, 2017, which is incorporated herein by reference in its entirety for all purposes.

BACKGROUND OF THE DISCLOSURE

Field of the Disclosure

This invention relates to the field of cyber security and the Internet of Things (IoT), more particularly, to a system and method to establish an end to end multi system trust chain between a client system and a remote system in a secure connection, wherein an intermediary system in the network flow path serves as a signing entity to establish transitive trust.

Description of the Related Art

An end-to-end trust chain may be established between endpoints (devices and gateways) deployed in the operational technology (OT) realm and remote services hosted in the information technology (IT) realm. This requires a trust anchor at each end to serve as a hardware, software or firmware based root of trust. However, OT endpoints inevitably traverse midstream security controls, such as network firewalls, to connect to IT applications and services for integration with analytics, processes and/or data repositories. Breaking encryption rooted in trust anchors and therefore the trust chain between peers, at a midstream security control for the purpose of content inspection, intrusion detection and/or access controls, breaks end-to-end confidentiality and integrity. Therefore, there is need to establish a transitive end-to-end trust chain without breaking encryption midstream. One approach to reestablishing end-to-end trust is to provide a trust anchor at the midstream security control. However, this bump in the wire approach introduces throughput and scalability bottlenecks because of session level decryption and encryption.

Typical network security devices (for example, next generation network firewalls and intrusion prevention systems) today must perform deep packet inspection of application traffic that traverses the OT/IT edge for application identification based access controls. However, client applications on a client system in the OT realm may encrypt data exchanges using a trust anchor based on a root of trust (i.e. a secure element with a cryptographic processor/engine such as for example a Trusted Platform Module (TPM), a Subscriber Identity Module (SIM) card based on Java Card technology, or a secure digital (SD) memory card (e.g. MicroSD)). The network security device therefore must either operate in a passive pass-through or an active proxy mode. Further, traffic encryption performed by the client application at the client system poses challenges to content inspection engines for application identification and protocol or behavior based anomaly detection at intermediate (midstream, bump in the wire, man-in-the-middle (MITM)) network security devices. Consequently, end to end traffic, between a client system in the OT realm and a remote system in the IT realm, must traverse an intermediate system at the OT/IT edge encrypted to preserve confidentiality and integrity of data exchanges circumventing traditional security controls.

Some of the current approaches use authentication methods for selective insertion of authorized intermediate appliances that may intercept and modify secure communications between the client and the server. As part of the session initiation between the client and the server, a second secure channel may be established via a first secure channel that includes participation by an authorized intermediate appliance in the session initiation between the client and the server. However, such a method requires sharing of secrets by the server with the client and the intermediate appliance. In sharp contrast, the proposed innovation establishes a trusted session between the client and the server that traverses the intermediate appliance without sharing any secrets with intermediate appliance thereby securing the communications path from any interception and/or modification of the channel at the intermediate appliance.

A root certificate authority (CA) may sign the certificate issued to an intermediate certificate authority to form a chain of trust. However, such signing does not constitute an end to end trust chain between systems and merely allows the intermediate CA to sign certificates on behalf of the root CA. Certificates issued to client and server systems by a CA may be used to establish secure encrypted communications between the systems.

SUMMARY OF THE DISCLOSURE

While a root of trust establishes trusted identification and attestation of an endpoint device, it is also necessary to physically anchor the endpoint's presence in the OT network. For example, an IoT gateway enrolled into a device management system must remain within its configured OT network. An active association between the OT endpoint (for example, a IoT gateway) and an intermediate system in the OT/IT edge (for example, a network firewall at the OT edge) provides a measure of trustability of the endpoint based on the flow path (network route). The trusted intermediate system provides a form of one-time notarization of the OT endpoint to the remote system.

Connection oriented and connectionless (datagram) services leverage the Transport Layer Security (TLS) protocol for secure transport. The two-way handshake sequence between a local client application and a remote service may be extended to support a transitive trust chain. This requires a method to facilitate an association between the trusted peers and an intermediate trusted system in the network flow path, wherein the data is transported between peers without breaking end-to-end encryption during transit, thereby protecting confidentiality and integrity of the data exchange.

In the proposed method, the negotiation phase to establish a session encrypted with a shared secret between the local client application and the remote service includes a first step of one-time signing performed by a trusted intermediate system in the flow path between the local client application and the remote service. A second step of one-time signature verification on the remote system proves to the remote service that the local client application at the client system (for example, a OT endpoint) is able to establish an explicit trust with an intermediate system (for example, a network firewall) along the flow path between the client and server systems and, optionally, exchange boot and execution trust measurements attested to by the respective root of trust anchors. In essence, a multi-system trust chain between a client system, an intermediate system, and a remote system is established through a three-way, instead of a two-way, handshake during secure session establishment. A two way handshake during the initial secure exchange protocol between a local client application and a remote service is extended to a three way handshake that includes a signature service on an associated intermediate system. The message signing is verified authoritatively at the remote system based on the signing certificate of the intermediate system for explicit proof of association. Further, session replay protection is provided by means of a one-time nonce as the artifact for signing and verification.

BRIEF DESCRIPTION OF THE DRAWING FIGURES

The disclosure is best understood from the following detailed description when read in connection with the accompanying drawings. According to common practice, various features/elements of the drawings may not be drawn to scale. Common numerical references represent like features/elements. The following figures are included in the drawings:

FIG. 5 is a schematic diagram illustrating the signature service interactions and control flows on the intermediate system in accordance with various exemplary embodiments of the disclosed system.

FIG. 6 is a flowchart illustrating a method of establishing an end to end multi system trust chain in accordance with various exemplary embodiments of the disclosed system.

FIG. 7 is a flowchart illustrating a method of establishing an end to end multi system transitive trust chain traversing an intermediate system in accordance with various exemplary embodiments of the disclosed system.

FIG. 8 is a schematic diagram of an exemplary computer system in which embodiments of the method of an end to end multi system trust chain can be implemented.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Although the disclosure is illustrated and described herein with reference to specific embodiments, the invention is not intended to be limited to the details shown herein. Rather, various modifications may be made in the details within the scope and range of equivalents of the claims and without departing from the scope of the disclosure.

Application identification in the industrial IoT requires both a certificate chain and trust anchors (i.e. secure elements) to protect private keying materials issued to the application on the host system. Establishing (and extending) the trust across the network requires an end to end trust chain that can traverse trusted intermediate network elements without requiring computationally intensive and cryptographically intrusive deep content inspection for protocol and behavior based anomaly detection. An innovative method to establish an end to end multi system trust chain that overcomes such scalability and privacy limitations in cross-realm environments is proposed. The proposed method offers significant safety and performance enhancements for mission critical IoT applications and services.

The client system 108 provides client application 110 identification to the signature service 114 based on a client certificate, boot metrics generated by a trust anchor 124 that serves as a root of trust (for example, a Trusted Platform Module (TPM)), and execution metrics requested from and reported by a root of trust (for example, Trusted Execution Environment (TEE), Intel® Enhanced Privacy ID (EPID), Intel® Software Guard Extension (SGX)).

Figure 1:
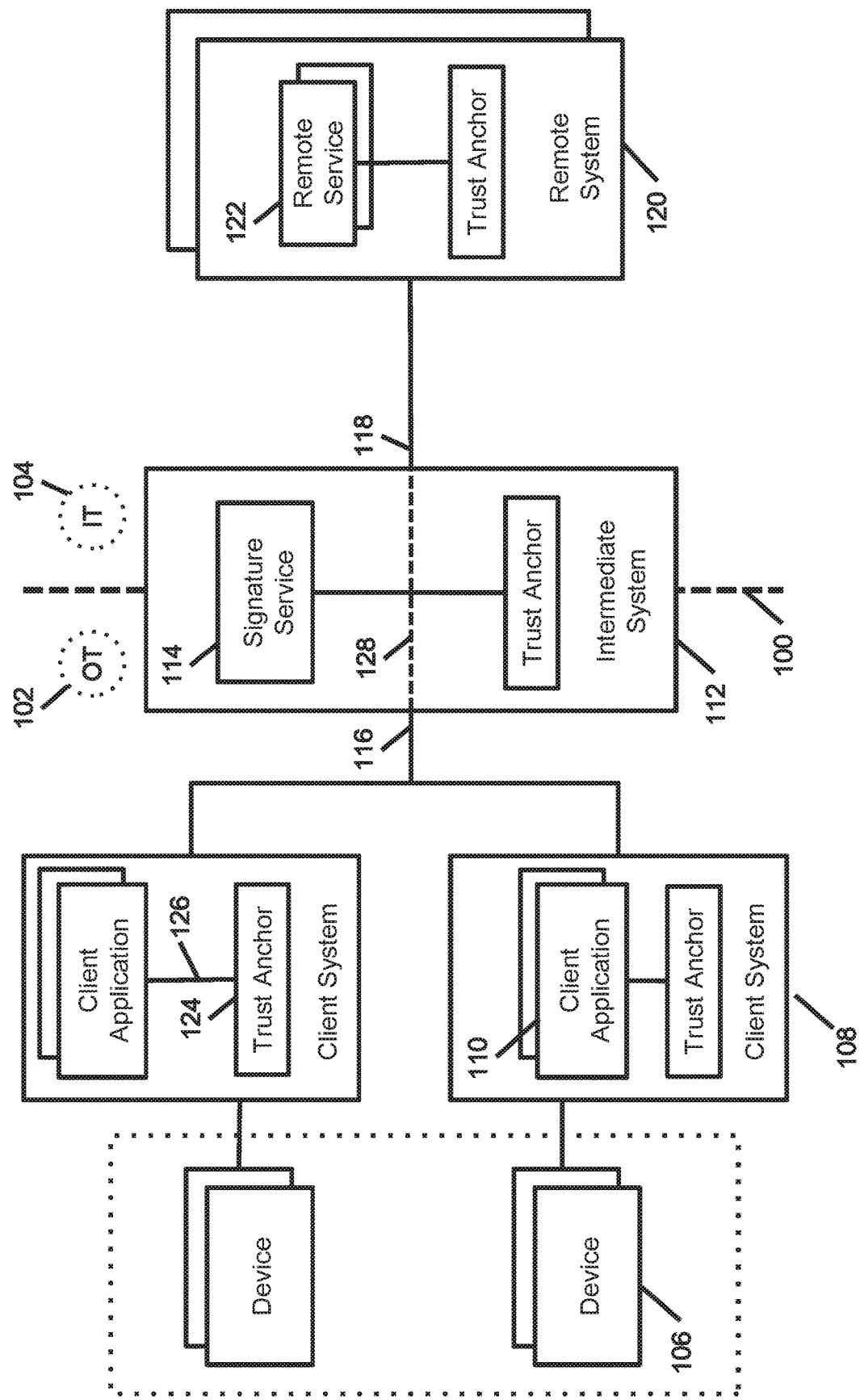
FIG. 1 is a schematic diagram illustrating a method of establishing an end to end multi system trust chain in accordance with various exemplary embodiments of the disclosed system.

Referring to FIG. 1, client applications 110 installed on client systems 108 receive digital and/or analog data feeds from a plurality of devices 106 (for example, sensors, actuators, programmable logic controllers (PLC), remote terminal units (RTU)) for local analytics and/or data archival by a data historian. The client systems 108 in the OT realm 102 establish a secure transport 116 to remote services 122 on remote systems 120 in the IT realm 104. A signature service 114 hosted on an intermediate system 112 at the OT/IT edge 100 provides a signing service during setup of a network flow path 118 traversing the intermediate system to establish an end to end trust chain between the client and remote systems. The trust anchors 124 on the client, intermediate, and remote systems respectively provide a hardware, software or firmware based root of trust interface 126 for application identification, measurement, and attestation.

A logical trust bridge 128 is established at the OT/IT edge 100 on the intermediate system 112 for network traffic traversal, between the OT edge 116 and IT edge 118 interfaces, based on a digital signature for a nonce issued by the signature service 114 to the client application 110.

In an exemplary embodiment of the disclosed system, the proposed two way handshake between the client application 110 and the remote service 122 may be integrated with the Secure Sockets Layer (SSL) or Transport Layer Security (TLS) protocol handshake between a SSL client and a SSL server (for example, the client hello, server hello and pre-shared secret messages).

In another exemplary embodiment of the disclosed system, the two way handshake between the client application 110 and the remote service 122 may be integrated with any form of non-repudiable challenge-response sequence between a client application and a remote service as part of an authentication and/or authorization ceremony.

In an exemplary embodiment of the disclosed system, the intermediate system 112 and the signature service 114 may be provisioned in the OT realm 102 as a standalone network server and network service respectively.

Figure 2:
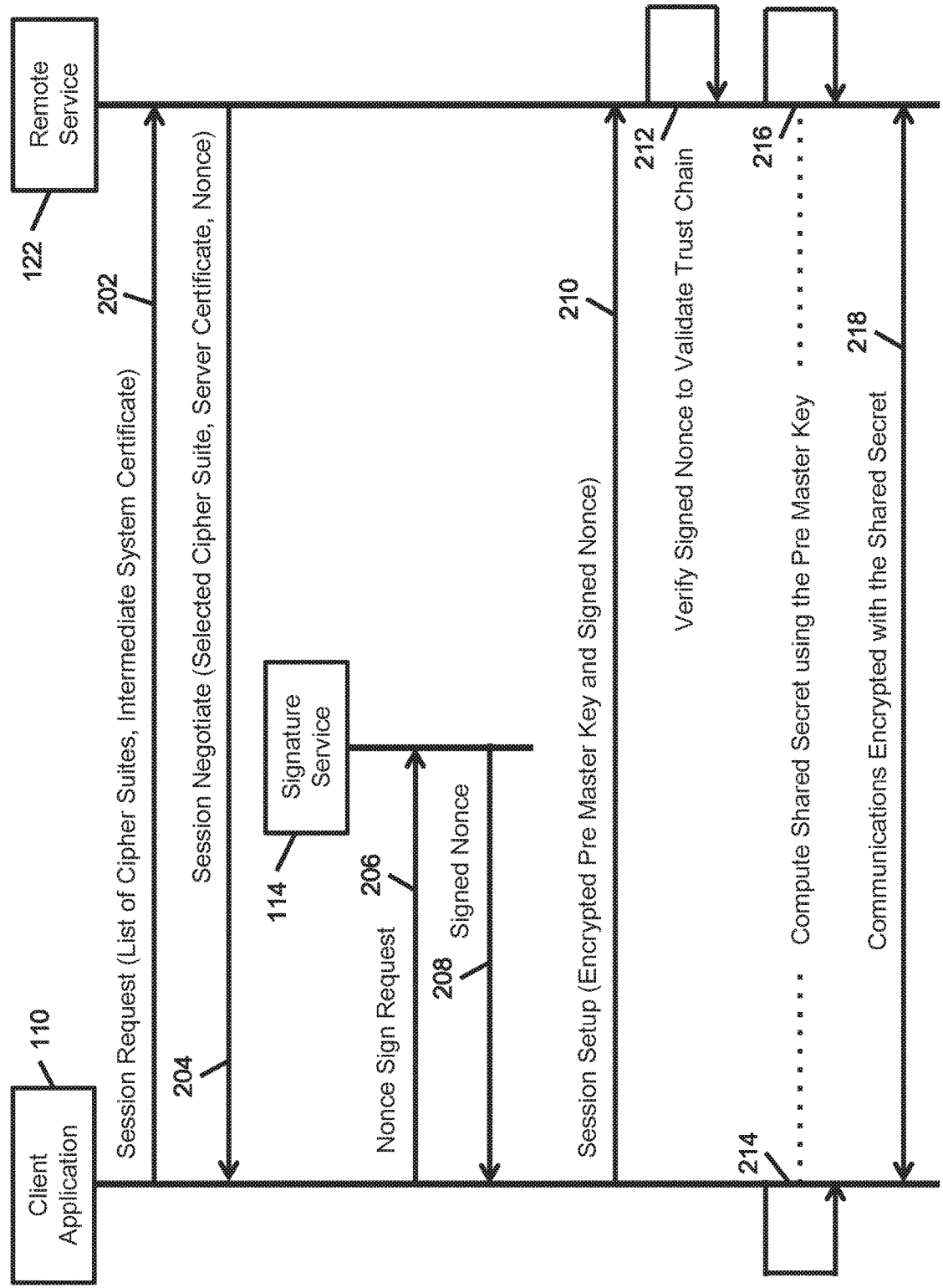
FIG. 2 is a schematic diagram illustrating a three way handshake sequence for session establishment between components of the model in accordance with various exemplary embodiments of the disclosed system.

Referring to FIG. 1 and FIG. 2, at step 202 the client application 110 sends a session request message comprising of at least a list of cipher suites and the intermediate system certificate to the remote service 122. At step 204, the remote service 122 sends a session negotiate message comprising of at least the selected cipher suite, the server certificate and a nonce. At step 206, the client application 110 establishes a secure connection with the signature service 114 using mutual certificate verification and optionally exchange of boot and execution metrics attested to by a trust anchor on the respective client and intermediate systems. The client application 110 sends the received nonce to the signature service 114 for digital signing. At step 208, the signature service 114 returns the signed nonce (i.e. a digital signature for the nonce) to the client application 110. At step 210, the client application 110 sends a session setup message to the remote service 122 comprising of at least an encrypted pre-master key and the signed nonce. At step 212, the remote service 122 verifies the signed nonce, using the public key of the verified intermediate system signing certificate, to validate the trust chain. At step 214, the client application 110 computes the shared secret using the pre-master key. At step 216, the remote service 122 computes the shared secret using the pre-master key. At step 218, the client application 110 and remote service 122 engage in encrypted communications using the shared secret, traversing the intermediate system associated with the signature service 114 in the flow path.

In an exemplary embodiment of the disclosed system, at step 210 the pre-master key generated by the client application 110 may be encrypted using the public key associated with the received remote service 122 certificate before sending the encrypted pre-master key to the remote service 122. The received encrypted pre-master key may be decrypted by the remote service 122 using the associated private key.

In another exemplary embodiment of the disclosed system, instead of receiving and signing a nonce from the remote service 122, at step 210 the client application 110 may generate a hash of the pre-master key, or a portion of the pre-master key, and sign the hash. At step 212, the remote service 122 may then verify the hash signature for the pre-master key.

In an exemplary embodiment of the disclosed system, the client application 110 may cache the received intermediate system 112 and remote service 122 certificates on the client system 108.

In yet another exemplary embodiment of the disclosed system, a remote service 122 that is not configured for the three way handshake for trust chain validation using the intermediate system certificate and the signed nonce may ignore the received intermediate system certificate and the signed nonce at steps 202 and 212 respectively. This provides interoperability with client applications 110 and remote services 122 based on common two way handshake protocols, such as for example SSL/TLS.

Figure 3:
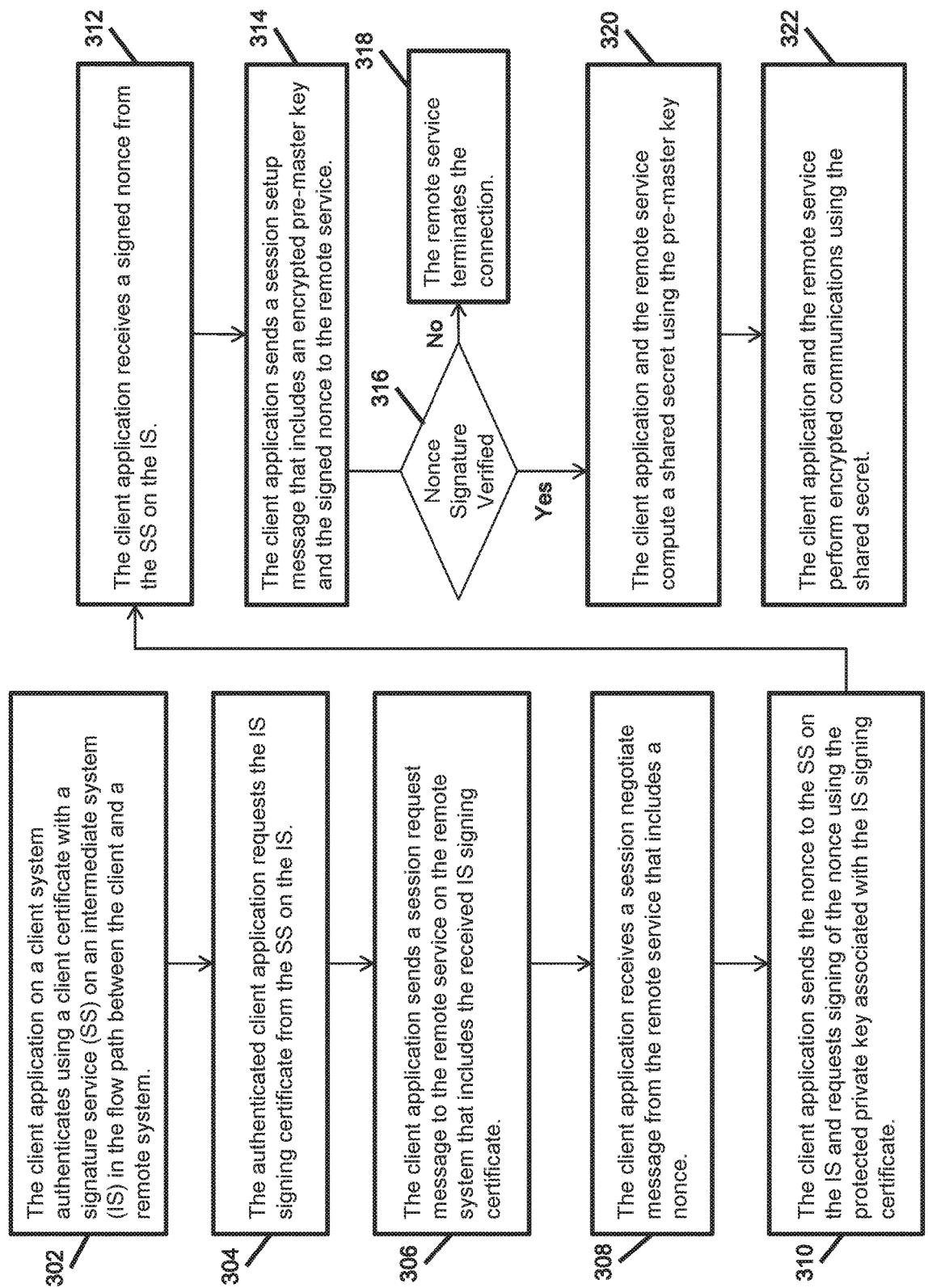
FIG. 3 is a schematic diagram illustrating the client application interactions and control flows on the client system in accordance with various exemplary embodiments of the disclosed system.

Referring to FIG. 1 and FIG. 3, at step 302 the client application 110 on a client system authenticates using a client certificate with a signature service 114 on an intermediate system 112 in the flow path between the client system 108 and a remote system 120. At step 304, the authenticated client application 110 requests the intermediate system's signing certificate from the signature service 114. At step 306, the client application 110 sends a session request message to the remote service 122 on the remote system 120 that includes the received intermediate system signing certificate. At step 308, the client application 110 receives a session negotiate message from the remote service 122 that includes a nonce. At step 310, the client application 110 sends the nonce to the signature service 114 and requests signing of the nonce using the protected private key associated with the intermediate system's signing certificate. At step 312, the client application 110 receives a signed nonce from the signature service 114. At step 314, the client application 110 sends a session setup message that includes an encrypted pre-master key and the signed nonce to the remote service 122. At step 316, the remote service 122 verifies the nonce signature using the public key associated with the received intermediate system signing certificate. The outcome of nonce signature verification determines control flow. At step 318, upon failure to verify the nonce signature, the remote service 122 terminates the connection with the client application 110. At step 320, upon successful verification of the nonce signature, the client application 110 and the remote service 122 compute a shared secret using the pre-master key. At step 322, the client application 110 and the remote service 122 perform encrypted communications using the shared secret.

Figure 4:
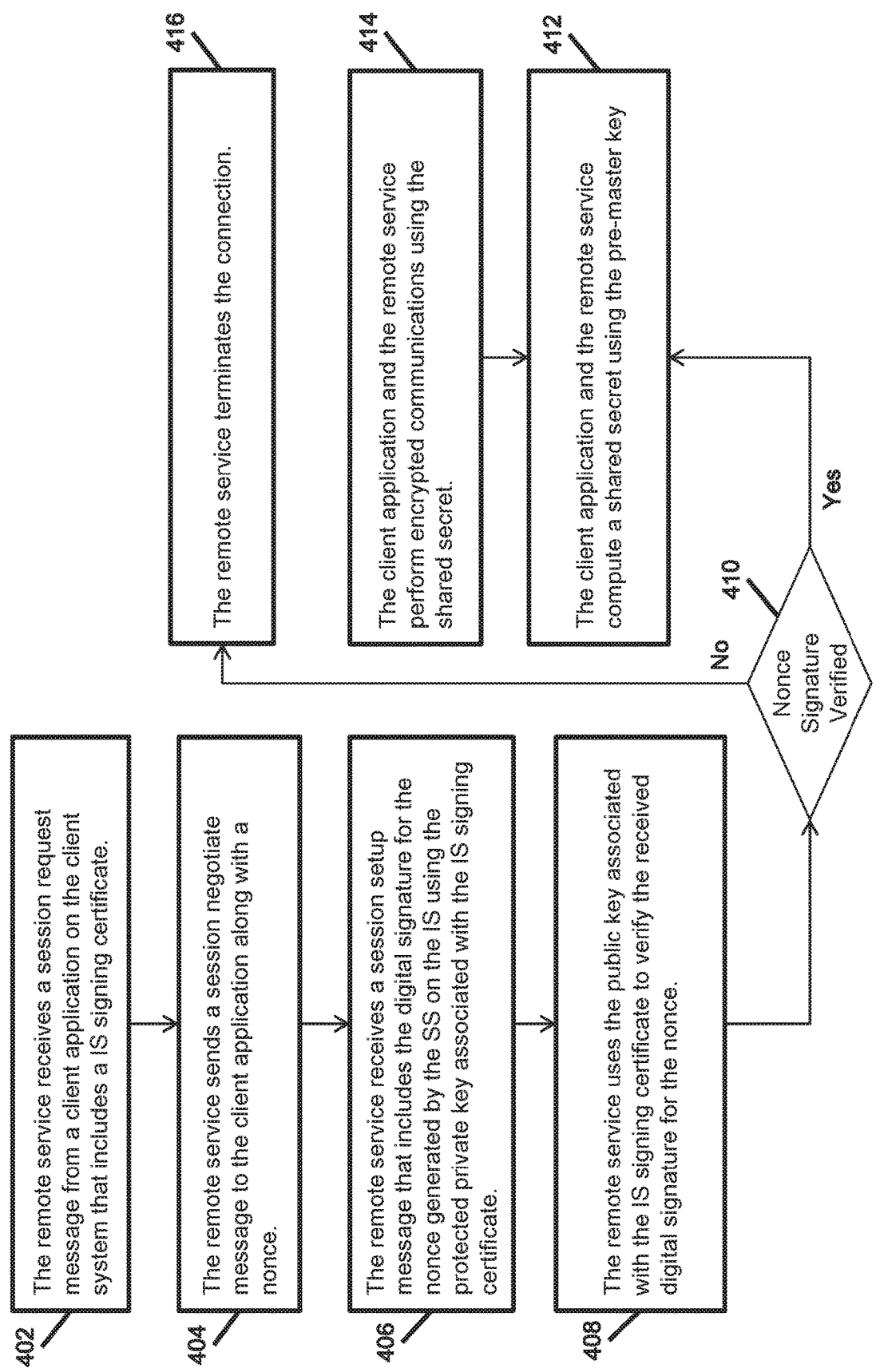
FIG. 4 is a schematic diagram illustrating the remote service interactions and control flows on the remote system in accordance with various exemplary embodiments of the disclosed system.

Referring to FIG. 1 and FIG. 4, at step 402, the remote service 122 receives a session request message from a client application 110 on the client system 108 that includes an intermediate system 112 signing certificate. At step 404, the remote service 122 sends a session negotiate message to the client application 110 along with a nonce. At step 406, the remote service 122 receives a session setup message that includes the digital signature for the nonce generated by the signature service 114 using the protected private key associated with the intermediate system's signing certificate. At step 408, the remote service 122 uses the public key associated with the intermediate system's signing certificate to verify the received digital signature for the nonce. At step 410, the outcome of nonce signature verification determines control flow. At step 416, upon failure to verify the nonce signature, the remote service 122 terminates the connection with the client application 110. At step 412, upon successful verification of the nonce signature, the client application 110 and the remote service 122 compute a shared secret using the pre-master key. At step 414, the client application 110 and the remote service 122 perform encrypted communications using the shared secret.

Referring to FIG. 1 and FIG. 5, at step 502, the signing service 114 accepts a secure connection from a client application 110 on a client system 108 using the client certificate for authentication. At step 504, the signature service 114 may receive additional identification and attestation attributes from the client application 110 on the client system 108 over the secure encrypted connection. At step 506, the client application 110 and signature service 114 may optionally exchange boot and execution trust measurements attested to by the respective local hardware, software or firmware based root of trust anchor. At step 508, the signature service 114 receives a request from the client application 110 for the signing certificate of the intermediate system 112. At step 510, the signaling service 114 sends the intermediate system's signing certificate to the client application 110 on the client system 108. At step 512, the signature service 114 receives a request from the client application 110 to sign a nonce received from a remote service 122. At step 514, the signature service 114 signs the nonce using the protected private key associated with the intermediate system's signing certificate, and sends the digital signature for the nonce to the client application 110. At step 516, the signature service 114 optionally receives a request for additional attributes that may include geo-location coordinates, and sends the requested attributes to the client application 110. At step 518, the secure connection between the client application 110 on the client system 108 and the signature service 114 on the intermediate system 112 is terminated.

FIG. 6 illustrates an exemplary method of establishing an end to end multi system trust chain between a client application on a client system, a signature service on an intermediate system, and a remote service on a remote system.

Referring to FIG. 6, at step 602 of the method, the client application sends a signing certificate of the intermediate system in a session request message of a two-way handshake sequence to the remote service.

At step 604 of the method, the remote service verifies the status of the received signing certificate of the intermediate system.

At step 606 of the method, the remote service generates a nonce for the client application.

At step 608 of the method, the remote service sends to the client application, the generated nonce in a session negotiate message of a two-way handshake sequence.

At step 610, the client application and the signature service establish a trusted session based on application identification and attestation by the client system.

At step 612, the client application sends to the signature service, the received nonce for issuance of a digital signature for the nonce by the intermediate system.

At step 614, the client application sends to the remote service in a session setup message the digital signature for the nonce received from the signature service.

At step 616, the remote service validates the trust chain by verifying the received digital signature for the nonce using the verified signing certificate of the intermediate system.

At step 618, the client application and the remote service establish a secure transport for encrypted communications traversing the intermediate system.

Referring to FIG. 7, at step 702 of the method, the intermediate system in the network flow path parses a nonce issued by a remote service to a client application in a two-way handshake sequence to establish a trust chain between the client system to the remote system.

At step 704 of the method, the intermediate system generates a dynamic rule to permit the two-way handshake sequence to establish a secure encrypted session. The dynamic rule comprises of at least the client system network (IP) address, the remote system network (IP) address, the source port number, and the destination port number associated with the client application and the remote service respectively in the session.

At step 706 of the method, the intermediate system receives a request from the client application to sign the nonce issued by the remote service.

At step 708 of the method, the intermediate system correlates the received nonce to the parsed nonce. The parsed nonce is associated with the dynamic rule on the intermediate system for session initiation between the client application and the remote service.

At step 710 of the method, the intermediate system verifies the trust metrics of the client application attested to by a trust anchor on the client system, prior to nonce signing. The trust metrics establish proof of trusted boot of the client system and trusted execution of the client application on the client system.

At step 712 of the method, the intermediate system updates the dynamic rule associated with the received nonce to permit the secure encrypted session without inspection of, or modifications to, the encrypted traffic between the client application and the remote service. The parsed nonce associated with the established session is purged from the intermediate system to prevent reuse.

At step 714 of the method, the intermediate system establishes a transitive trust chain between the client system and the remote system that traverses the intermediate system in the network flow path. On termination of the session between the client application and the remote service, the associated dynamic rule is automatically deleted on the intermediate system.

FIG. 8 illustrates an example computer system 800 in which embodiments of the present invention, or portions thereof, may be implemented as computer-readable code. For example, the network systems and architectures disclosed here can be implemented in computer system 800 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores".

Various embodiments of the invention are described in terms of this example computer system 800. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 802 may be a special purpose or a general-purpose processor device. As will be appreciated by persons skilled in the relevant art, processor device 802 may also be a single processor in a multi-core/multiprocessor system, such system operating alone, or in a cluster of computing devices operating in a cluster or server farm. Processor device 802 is connected to a communication infrastructure 826, for example, a bus, message queue, network, or multi-core message-passing scheme.

The computer system 800 also includes a main memory 804, for example, random access memory (RAM), and may also include a secondary memory 806. Secondary memory 806 may include, for example, a hard disk drive 808, removable storage drive 810. Removable storage drive 810 may comprise a floppy disk drive, a magnetic tape drive, an optical disk drive, a flash memory, or the like.

The removable storage drive 810 reads from and/or writes to a removable storage unit 812 in a well-known manner. Removable storage unit 812 may comprise a floppy disk, magnetic tape, optical disk, etc. which is read by and written to by removable storage drive 810. As will be appreciated by persons skilled in the relevant art, removable storage unit 812 includes a non-transitory computer usable storage medium having stored therein computer software and/or data.

In alternative implementations, secondary memory 806 may include other similar means for allowing computer programs or other instructions to be loaded into computer system 800. Such means may include, for example, a removable storage unit 816 and an interface 814. Examples of such means may include a program cartridge and cartridge interface (such as that found in video game devices), a removable memory chip (such as an EPROM, or PROM) and associated socket, and other removable storage units 816 and interfaces 814 which allow software and data to be transferred from the removable storage unit 812 to computer system 800.

The computer system 800 may also include a communications interface 818. Communications interface 818 allows software and data to be transferred between computer system 800 and external devices. Communications interface 818 may include a modem, a network interface (such as an Ethernet card), a communications port, a PCMCIA slot and card, or the like. Software and data transferred via communications interface 818 may be in the form of signals, which may be electronic, electromagnetic, optical, or other signals capable of being received by communications interface 818. These signals may be provided to communications interface 818 via a communications path 820. Communications path 820 carries signals and may be implemented using wire or cable, fiber optics, a phone line, a cellular phone link, an RF link or other communications channels.

The computer system 800 may also include a computer display 824 and a display interface 822. According to embodiments, the display used to provision and manage certificates may be the computer display 824, and the console interface may be display interface 822.

In this document, the terms "computer program medium," "non-transitory computer readable medium," and "computer usable medium" are used to generally refer to media such as removable storage unit 812, removable storage unit 816, and a hard disk installed in hard disk drive 808. Signals carried over communications path 820 can also embody the logic described herein. Computer program medium and computer usable medium can also refer to memories, such as main memory 804 and secondary memory 806, which can be memory semiconductors (e.g., DRAMs, etc.). These computer program products are means for providing software to computer system 800.

Computer programs (also called computer control logic) are stored in main memory 904 and/or secondary memory 806. Computer programs may also be received via communications interface 818. Such computer programs, when executed, enable computer system 800 to implement the present invention as discussed herein. In particular, the computer programs, when executed, enable processor device 802 to implement the processes of the present invention, such as the stages in the methods illustrated by the flowcharts in FIGS. 1-7, discussed above. Accordingly, such computer programs represent controllers of the computer system 800. Where the invention is implemented using software, the software may be stored in a computer program product and loaded into computer system 800 using removable storage drive 810, interface 814, and hard disk drive 808, or communications interface 818.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A method of establishing a trust chain between a client application on a client system, a signature service on an intermediate system, and a remote service on a remote system, the method comprising:
    transmitting, by the client application to the remote service, a signing certificate of the intermediate system in a session request message;
    verifying, by the remote service, status of the signing certificate of the intermediate system;
    generating, by the remote service, a nonce for the client application;
    transmitting, from the remote service to the client application, the nonce in a session negotiate message of a two-way handshake sequence;

establishing, by the client application and the signature service, a trusted session based on application identification and attestation by the client system;

transmitting, from the client application to the signature service, the nonce for issuance of a digital signature for the nonce by the intermediate system;

transmitting, from the client application to the remote service, in a session setup message the digital signature for the nonce in a session setup message;

validating, by the remote service, the trust chain by verifying the digital signature for the nonce using the verified signing certificate of the intermediate system; and establishing, by the client application and the remote service, a secure transport for encrypted communications traversing the intermediate system, wherein the client application and signature service exchange boot and execution trust measurements, attested to by a respective local root of trust anchor for application identification, prior to issuance of the digital signature for the nonce.

2. The method of claim 1, wherein the signing certificate of the intermediate system is included by the client application as an optional attribute in the session request message.

3. The method of claim 1, wherein the client application sends the digital signature for the nonce in the session setup message that includes an encrypted pre-master key to the remote service.

4. The method of claim 1, wherein a secure connection is established between the client application and the signature service on the intermediate system with mutual certificate verification and application identification prior to transfer of the nonce and issuance of the digital signature for the nonce.

5. The method of claim 1 further comprising signing the nonce, performed by the signature service using a private key protected by a root of trust anchor on the intermediate system.

6. The method of claim 1 further comprising verifying the signed nonce, performed using a public key extracted from the signing certificate issued to the intermediate system.

7. A method of establishing a trust chain between a client application on a client system, a signature service on an intermediate system, and a remote service on a remote system, the method comprising:

transmitting, by the client application to the remote service, a signing certificate of the intermediate system in a session request message;

verifying, by the remote service, status of the received signing certificate of the intermediate system associated with a protected private key on the intermediate system;

generating, by the remote service, a nonce for signing by the intermediate system;

transmitting, by the remote service to the client application, the nonce in a session negotiate message of a two-way handshake sequence;

establishing, by the client application and the signature service, a trusted session based on application identification and attestation by the client system;

exchanging, by the client application and the signature service, boot and execution trust measurements for the client system and the intermediate system attested to by the respective local root of trust anchors;

verifying, by the signature service on the intermediate system, the received boot and execution trust measurements attested to by the root of trust on the client system;

transmitting, from the client application to the signature service, the nonce for issuance of a digital signature for the nonce by the intermediate system;

receiving, from the signature service on the intermediate system, the digital signature for the nonce generated using the protected private key associated with the signing certificate of the intermediate system;

transmitting, from the client application to the remote service, the received digital signature for the nonce in a session setup message;

validating, by the remote service, the trust chain by verifying the digital signature for the nonce using the verified signing certificate of the intermediate system; and establishing, by the client application and the remote service, a secure transport for encrypted communications traversing the intermediate system.

8. The method of claim 7, wherein the signing certificate of the intermediate system is included by the client application as an optional attribute in the session request message.

9. The method of claim 7, wherein the client application sends the digital signature for the nonce signed by the signature service on the intermediate system in the session setup message to the remote service.

10. The method of claim 7, wherein a secure connection is established between the client application and the signature service on the intermediate system with mutual certificate verification and application identification prior to transfer of the nonce and issuance of the digital signature for the nonce.

11. The method of claim 7, further comprising signing the nonce, performed by the signature service using a private key protected by a root of trust anchor on the intermediate system.

12. The method of claim 7, further comprising verifying the signed nonce, performed using a public key extracted from the signing certificate issued to the intermediate system.

* * * * *